(No Model.)
J. G. MOONEY.
BICYCLE.
No. 601,025. Patented Mar. 22, 1898.
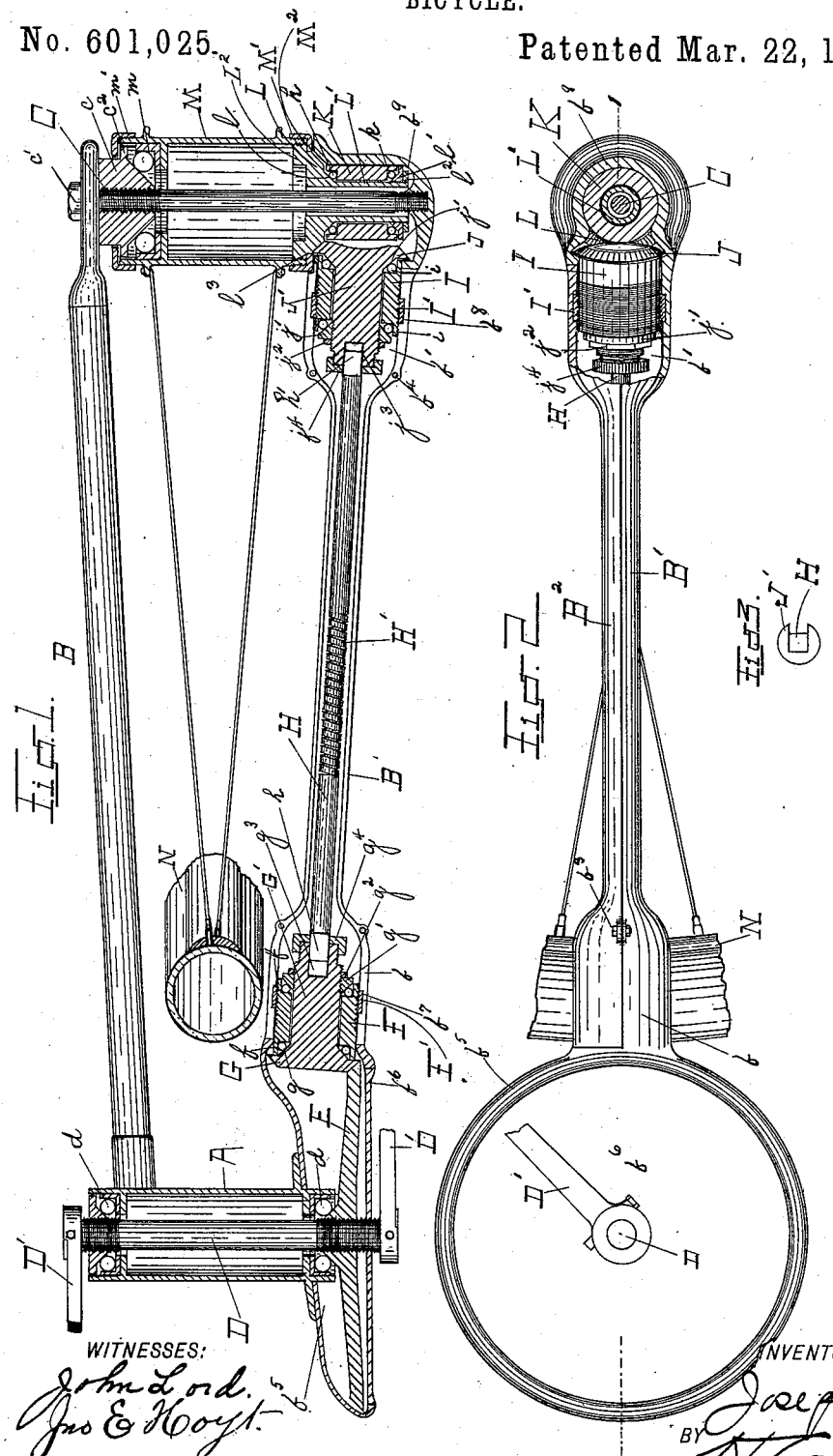

UNITED STATES PATENT OFFICE.

JOSEPH GEORGE MOONEY, OF ERIE, PENNSYLVANIA.

BICYCLE.

SPECIFICATION forming part of Letters Patent No. 601,025, dated March 22, 1898.

Application filed September 13, 1897. Serial No. 651,536. (No model.)

*To all whom it may concern:*

Be it known that I, JOSEPH GEORGE MOONEY, a citizen of the United States, residing at Erie, in the county of Erie and State of Pennsylvania, have invented certain new and useful Improvements in Bicycles; and I do hereby declare the following to be a full, clear, and exact description of the invention, such as will enable others skilled in the art to which it appertains to make and use the same.

This invention relates to bicycles; and it consists in certain improvements in the construction thereof, as will be hereinafter fully described, and pointed out in the claims.

More particularly my invention relates to that style of bicycle popularly denominated the "chainless" bicycle, and has reference particularly to the propelling mechanism.

The objects of the invention are to provide a gear-propelling mechanism with convenient means for adjustment, protection from dirt, and a quickly-operated means for disengaging the driving-wheel of the bicycle from the propelling mechanism and the frame of the wheel, as well as to provide advantageous details of construction.

The invention is illustrated in the accompanying drawings as follows:

Figure 1 is a sectional view of the part of the bicycle to which my invention relates on the line 1 1 in Fig. 2. Fig. 2 is a side elevation of the same part. Fig. 3 shows a detail of construction.

A marks the crank-hanger, B one side of the lower fork, and C the rear axle, which is secured to the fork B as in any of the usual constructions.

The crank-shaft D is provided with the bearings $d$ and supports the cranks $d'$. Locked on the crank-shaft is the bevel gear-wheel E.

The side of the fork B' is formed of a tube provided with the enlargement or pocket $b$, concentric with the tube B' and located just back of the periphery of the gear E. A similar enlargement or pocket is located near the rear end of the side, and a transverse enlargement is placed concentric with the rear axle C.

A disk $b^5$, preferably formed integrally with the part B', forms the connection to the crank-hanger and surrounds the gear E. A complete closure is effected by the plate $b^6$, which is screwed into the disk, as shown. The upper part of the fork B' is in the form of a removable cap $B^2$, fastened by screws or bolts at $b^3$ $b^4$, which when removed leaves an opening through which the inclosed parts may be inserted or adjusted. The enlargement $b$, which may be termed a "bearing-pocket," is milled out both in the cap and fixed part, and a sleeve F, shaped to fit the pocket, is inserted. A gear G meshes the gear E. It is provided with the hub G', which extends back through the sleeve F. A cone $g$ is formed on the gear end of the hub G', and a cone $g'$ is screwed onto the opposite end of the hub. These, with the cups $f$ and inserted balls, form the bearing for the gear G and form what I term a "double ball-bearing." A lock-nut $g^2$ is provided for locking the cone $g'$ at the point of adjustment desired. An annular groove $b^7$ is cut into the pocket $b$, and into this is placed a ring-nut F'. The sleeve F is screw-threaded, so as to be engaged by the ring-nut and hold the sleeve against turning with the fingers. By turning the ring-nut the sleeve, and consequently the gear, may be shifted either toward or from the gear E, so as to properly adjust it to position. It will be noted that the adjustment of the gear is independent of the adjusting means for the bearing, so that the adjustment of either may be accomplished without affecting the other. The inner surface of the cap is arranged to engage and clamp the sleeve F, to thus lock the sleeve in position.

The pocket $b'$ is similar in construction and arrangement to the pocket $b$, but in the reverse direction, and contains a similar arrangement of mechanism, the several parts of which will be readily understood from what has been said of the mechanism contained in the pocket $b$ and are lettered as follows: gear J, hub J', cones $j\ j'$, and lock-nut $j^2$, sleeve I, ring-nut I', cups $i\ i$ in the sleeve I, which with interposed balls form bearings with the cones $j\ j'$.

The shaft H is squared at its ends $h\ h'$ and is dropped into slots $g^3\ j^3$ in the hubs G' and J'. A flange-nut $g^4\ j^4$ encircles the shaft H and centers it with the hubs G' and J'. The central part of the shaft has the coil-spring $h$, which allows a slight bending of the shaft should the pockets $b$ $b'$ spring out of alinement.

The pocket $b^9$ is drilled from the inside of the fork and has placed in it the sleeve K, which is provided at its ends with the cups $k$ $k$. A gear L meshes the gear J and is provided with the hollow hub L'. A cone $l$ is formed on the hub at the gear end, and a cone $l'$ is screwed into the opposite end. These cones, with the cups $k$ and interposed balls, form a double ball-bearing for the gear L and part of the bearing for the drive-wheel N. A lock-nut $l^2$ is provided for locking the cone $l'$ in position to secure a proper adjustment for the bearing. The gear L has an inward extension $L^2$, which is screw-threaded and screwed into the hub M of the drive-wheel N. A flange-nut M', preferably oppositely threaded from that of the extension $L^2$, is screwed onto the outer surface of the hub M. The flange $M^2$ of said nut engages a shoulder $l^3$ on the extension $L^2$, and thus locks the hub M with the gear L.

The axle C is passed through the hub L' and screwed into the bottom of the pocket $b^9$. A cone $c$ is screwed into the axle at the end opposite the gear L, and this, with the cup in the hub M and the interposed balls, forms the bearing at that side of the wheel N. The nut $c'$, which secures the axle in the fork B, locks the cone $c$.

If it is desired to remove the wheel N for replacing the tire or other purpose, the flange-nut M' is unscrewed and the extension $L^2$ unscrewed. The axle is then unscrewed from the cone $c$ and the bottom of the pocket $b^9$ and removed. This disengages the wheel, so that it can readily be removed. A retainer-shoulder $c^2$ and cap $m'$ hold the cone $c$ in place in the hub M.

It will be noted that the removal of the wheel has not altered the adjustment of the gears or any of their bearings, so that they remain in position with the wheel removed from the frame. It will also be noted that the replacing of the wheel, which is simply the reverse of the operation described, does not require a readjustment of the gears or their bearings. This I consider a very important feature of my invention, as it allows the repairs which are apt to be necessary to the wheel to be made without interfering with the adjustment of the gears or their bearings, so that when once properly adjusted they may continue so for a long period without the interference of unskilled hands, which are apt to impair their usefulness.

It will also be noted that the adjustment of the gears one to another is independent of the adjustment of the several bearings for the gears, so that a nice adjustment of both bearings and gears may be readily accomplished.

By making the rear bracket containing the pockets $b'$ and $b^9$ of a single forging or casting or pieces brazed or permanently and rigidly united a rigid one-piece bracket is formed, which in connection with the double ball-bearings in the pockets $b'$ and $b^9$ permanently hold the gears carried by said bearings at the proper angle to each other.

What I claim as new is—

1. In a bicycle, the combination with the frame; of the driving-wheel arranged to be secured in and removed from the frame; a bearing carried by the frame and arranged to give support to the driving-wheel when said wheel is in place and to remain in position in the frame with said wheel removed therefrom; a gear carried by said bearing when the wheel is in place in the frame; and a driving-gear meshing said gear.

2. In a bicycle, the combination with the frame; of the driving-wheel arranged to be secured in and removed from the frame; a bearing carried by the frame and arranged to give support to the driving-wheel when said wheel is in place and to remain in position with said wheel removed therefrom; a gear carried by said bearing and arranged to remain in place with the bearing and the driving-gear when the driving-wheel is removed from the frame; and a driving-gear meshing said gear.

3. In a bicycle, the combination with the frame; of the driving-wheel arranged to be secured in and removed from the frame; a ball-bearing carried by the frame and arranged to give support to the driving-wheel when said wheel is in place in the frame; means for adjusting said bearing, which means are arranged to remain in position in the frame with the wheel removed from the frame; a gear carried by said bearing when the wheel is in place in the frame; and a driving-gear meshing said gear.

4. In a bicycle, the combination with the frame; of the driving-wheel arranged to be secured in and removed from the frame; a bearing carried by the frame and arranged to give support to the driving-wheel when said wheel is in place in said frame; a gear carried by said bearing; a driving-gear meshing said gear; and means for adjusting said gears to each other, which means and said bearing are arranged to remain in position when the wheel is removed from the frame.

5. In a geared bicycle, the combination of the frame having a pocket; a removable cover for said pocket arranged to make a longitudinal opening when removed; a sleeve in said pocket; a gear journaled with a double ball-bearing in said sleeve; means exposed by the removal of said cover for shifting the sleeve longitudinally in said pocket for adjusting the gear; and means arranged on the cover for locking the sleeve in the position, to which it is adjusted, when the cover is in place.

6. In a geared bicycle, the combination of the frame having a pocket as, $b$, with a groove, $b^7$, therein; the sleeve, F, in said pocket; the gear, G, journaled in said sleeve; and the nut, F', on said sleeve and arranged in the groove, $b^7$.

7. In a geared bicycle, the combination of the frame having a pocket; a sleeve in said pocket; a gear journaled in said sleeve; means for shifting the sleeve in said pocket; and a removable cover for said pocket arranged to lock said sleeve in position.

8. In a geared bicycle, the combination of the driving-wheel; the frame provided with a rigid one-piece rear bracket containing the pockets $b'$ and $b^9$ arranged at an angle to each other; double ball-bearings in both of said pockets, the one in pocket $b^9$ being arranged to give support to the driving-wheel and gears in mesh with each other and carried by said bearings.

9. In a geared bicycle, the combination of the removable driving-wheel; the frame; a bearing carried by said frame and arranged to remain in position in the frame when the driving-wheel is removed therefrom; the gear L secured to the driving-wheel and provided with a hollow hub journaled in said bearing; and the axle extending through said hub and secured to the frame.

10. In combination with the gear having the hub provided with a slotted opening, $j^3$; the shaft having the squared end placed in said slot; and the nut $j^4$ having the centrally-located perforation through which the shaft passes for securing and centering said shaft.

In testimony whereof I affix my signature in presence of two witnesses.

JOSEPH GEORGE MOONEY.

Witnesses:
  H. C. LORD,
  JOHN LORD.